June 7, 1938.  W. E. VAN DORN ET AL  2,119,896

ARTICULATOR

Filed Oct. 30, 1935   3 Sheets-Sheet 1

INVENTOR.
William E. Van Dorn
& Wilfrid H. Terrell
BY
ATTORNEY.

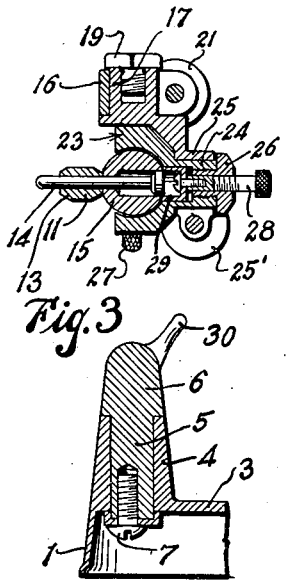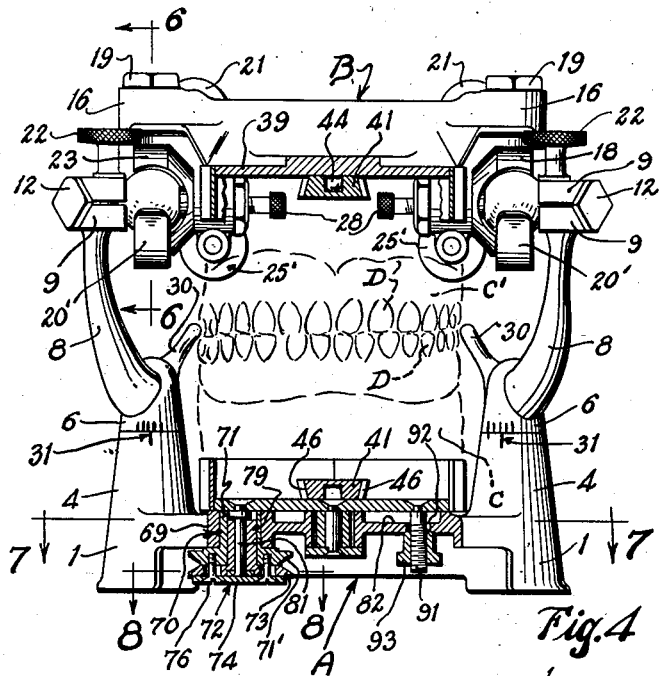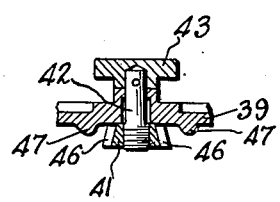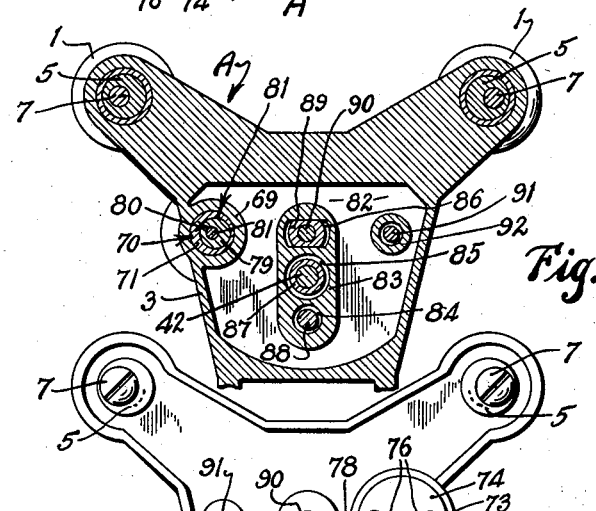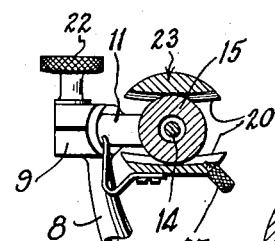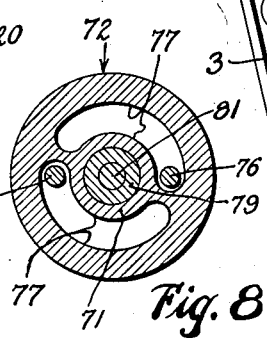

Patented June 7, 1938

2,119,896

UNITED STATES PATENT OFFICE 2,119,896

ARTICULATOR

William E. Van Dorn and Wilfrid H. Terrell, Pasadena, Calif., assignors to Precision Dental Mfg. Co., Pasadena, Calif., a corporation of California Application October 30, 1935, Serial No. 47,434

11 Claims. (Cl. 32—32)

This invention relates to and has for an object the provision of an improved type of articulator adapted to use in the production of artificial dentures whereby accurate reproduction of the mandibular positions as recorded from natural dentures is possible and, further, contemplates the provision of means for definitely and positively adjusting the relative positions and movements of the maxillary and mandibular dentures with full regard for normality, abnormality, irregularity or deformity.

In more detail, an object of this invention is to provide a general universality of movement between the upper and lower members, simulating the movements of the human jaws under varying conditions and including universally adjustable condyle axes, an incisal guide fixed to the upper member and provided with an adjustable member adapted for movement over and controlled by a set of inner cams for influencing the lateral and protrusive adjustment and a set of outer cams for influencing the adjustment of the rotation centers, all in conformity with natural or unnatural conditions prevalent in the jaws and dentures of a human being.

Another object is to provide an improved method and means for mounting the molds, or casts, on the upper and lower members of the articulator whereby the same may be firmly held in positions for manipulation and yet readily removed from their supports without impairing the molds or dentures and replaced in their correct positions and relationship on the articulator at will.

An important object is to provide condylar adjustments and mountings embodying broken axes in transversely alined positions, subject however to malalinement under certain conditions, and consisting of horizontally disposed pins which are rotatably adjustable on horizontal axes and are additionally adjustable by rotating the same on vertical axes of their supports, and fulcrums therefor in the form of spheres which are both rotatable and slidable on axes disposed at acute angles with respect to the axes of said pins. Thus, the upper member of the articulator is necessarily provided with condylar paths for the reception of the spherical fulcrums which, under the influence of the incisal guide in its movement over the inner and outer cams makes it possible to reproduce any conceivable condition of the human jaws.

A still further object is to provide an improved form of grinding means on the articulator by means of which the artificial teeth when held in their casts may be accurately ground together and occluded to an extent and to the same effect as in natural dentures in a particular case. Other objects may appear as the description progresses.

We have shown a preferred form of articulator embodying our improvements in the accompanying drawings, subject to modification within the scope of the appended claims without departing from the spirit of our invention. In said drawings:

Fig. 3 is a sectional plan on line 3—3 of Fig. 2;

Fig. 3a is a sectional elevation on line 3a—3a of Fig. 10;

Fig. 4 is a sectional elevation on line 4—4 of Fig. 2;

Fig. 5 is a fragmentary sectional plan of the upper mold mounting on line 5—5 of Fig. 2;

Fig. 6 is a sectional elevation of one of the condyle supports and adjustments on line 6—6 of Fig. 4;

Fig. 7 is a sectional plan of the lower member on line 7—7 of Fig. 4, showing details of the grinder and mold support;

Fig. 8 is a sectional plan of the same on line 8—8 of Fig. 4;

Fig. 9 is a partial bottom plan view of the lower member;

Figure 16:
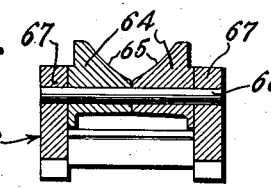
Figs. 16 and 17 are similar views of one of the condylar supports showing the broken axes therefor disposed in different directions.
Figure 12:
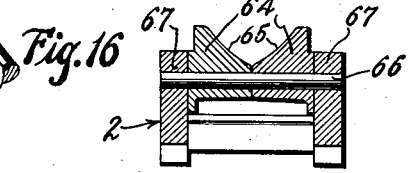
Fig. 12 is a section on line 12—12 of Fig. 10 of the outer incisal guide cams.

Our articulator includes a lower or base member A and an upper member B, the former of which is adapted to be supported on a suitable table or the like and the latter of which is movably held on the member A. Member A has a pair of laterally spaced feet 1, 1, at the rear and a single foot 2 at the front with a horizontally disposed plate 3 connecting said feet and arranged so that the plate will be flatwise of the supporting surface. Vertical bosses 4, 4, are formed on the lower member as continuations of the feet 1, 1, and are vertically bored to receive studs 5, 5, of members 6, 6, which are adjustably held in said bosses by means of screws 7. Members 6 have outwardly and upwardly extended arms 8 with split bearings 9 on their upper ends for adjustably holding pins 10 of condylar supporting members 11 (see Fig. 16) said pins being rotatably adjustable on horizontal axes in bearings 9 and adapted to be held accurately in place by means of nuts 12 and locked in selected positions by means of nuts 22. Members 11 have relatively angularly disposed bearings 13 in which pins 14 are fixedly held and the inwardly extended portions of pins 14 carry spherical fulcrums 15 which are both rotatable and longitudinally slidable on said pins.

The upper member B has a pair of laterally spaced bosses 16, 16, which rotatably support pins 17 extended vertically from suspended brackets 18 and are adapted to be held accurately in place by means of screws 19 and locked against rotation by means of nuts 21. Said brackets 18 have arcuately formed condyle tracks 20 formed between upper and lower portions thereof and are adapted to movably receive the spherical fulcrums 15, as shown in Fig. 6. The bosses 16 are split radially so that by means of screws 21 they may be contracted for holding the pins 17 in fixed positions thereon. In a similar manner the split bosses 9 may be set by means of screws 22 for holding the pins 10 against rotation.

The condyle tracks 20 are formed in adjustable members 23 and have extensions 24 which extend through split bosses 25 in brackets 18 (see Fig. 3) and are adapted to be held accurately in place by means of screws 26 and locked in position by means of clamping screws 25' carried in bosses 25, for the purpose of tiltably adjusting the tracks 20 on their axes 24. Tracks 20 may be manipulated by means of knurled finger grips 27, or otherwise. The fulcrums 15 may freely traverse the tracks 20 and they may be centered by means of set screws 28 which are threaded through the screws 26 and have attached heads 29 within the extensions 24 of the track members 23 which are adapted to cup over and engage the surface of the spheres 15 and prevent their movement in the tracks 20. Bosses 25 carry screws 25' which serve to tighten the bearings 24. Fulcrums 15 are prevented from displacement from the inner ends of tracks 20 by clips 20' attached to the bottoms of members 23 and having their ends extended upwardly at the ends of said tracks, and from the outer ends of said tracks by the protruding ends of screws 27.

Thus, it will be noted that the upper member B is hingedly mounted on the lower member A and has its hinges at members 15, and said member B may be swung backwardly so that the heads of screws 21 will engage horns 30 inwardly and upwardly extended from the members 6, thereby limiting the rearward movement of the upper member. It is quite apparent that by adjusting the condyle tracks 20 on the brackets 18, the brackets 18 on the bosses 16, the members 11 on the bearings 9 and the members 6 in the bosses 4, a universality of movement may be effected for the upper member to conform to any deformity of the dentures, irregularities or peculiarities of the condyle and occlusive movements, and compensation for abnormal conditions of the mouth and jaws of a particular case.

In this connection it should also be noted that suitable graduations are provided on the bearings or bosses of all movable parts for registration with a single marking on an adjacent stationary part, whereby records of adjustments may be made and kept for adjusting the articulator to different cases. For instance, see the graduations 31 on members 6 and bosses 4, 32 on bearings 9 and members 11, 33 on bosses 16 and brackets 18, 34 on track members 23, etc.

Figures 1, 2:
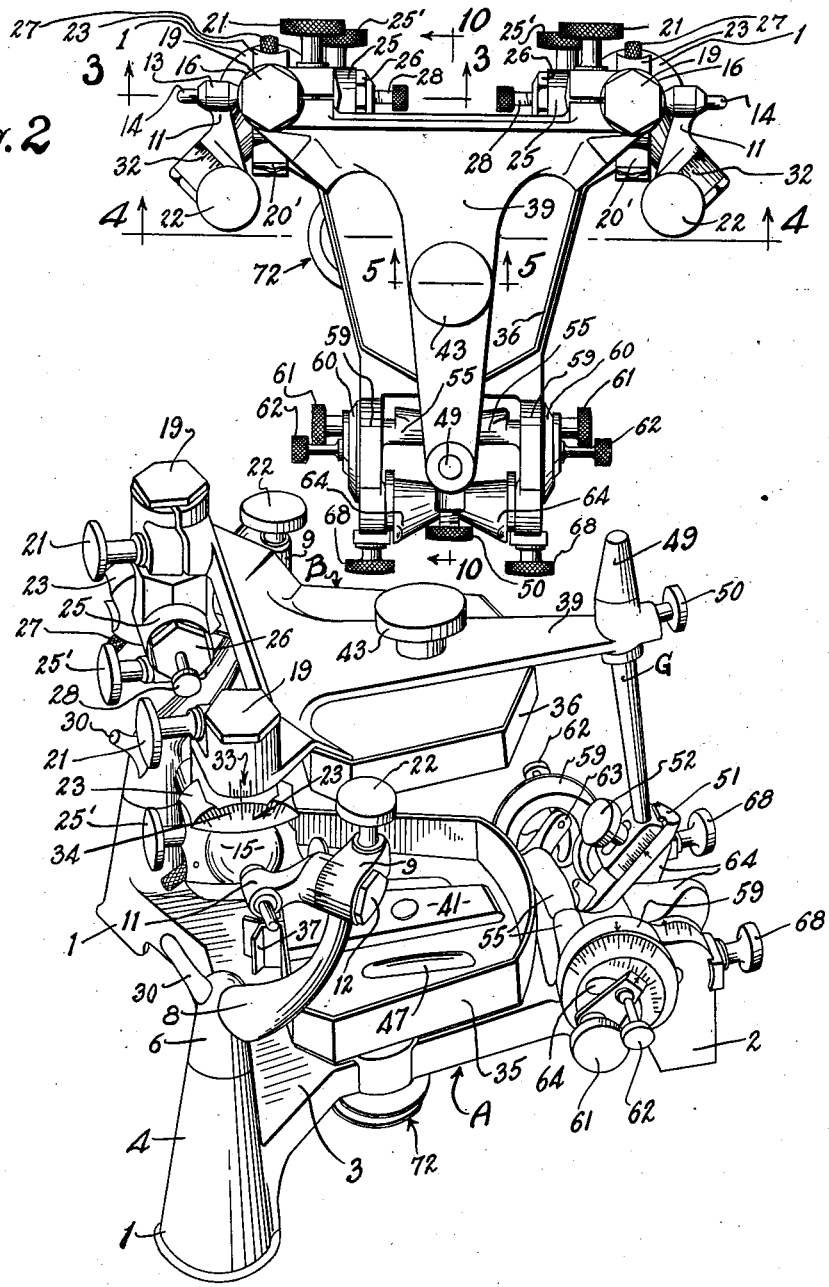
Fig. 1 is a perspective view of an assembled articulator embodying our improvements.
Fig. 2 is a top plan view of the same.
Figure 10:
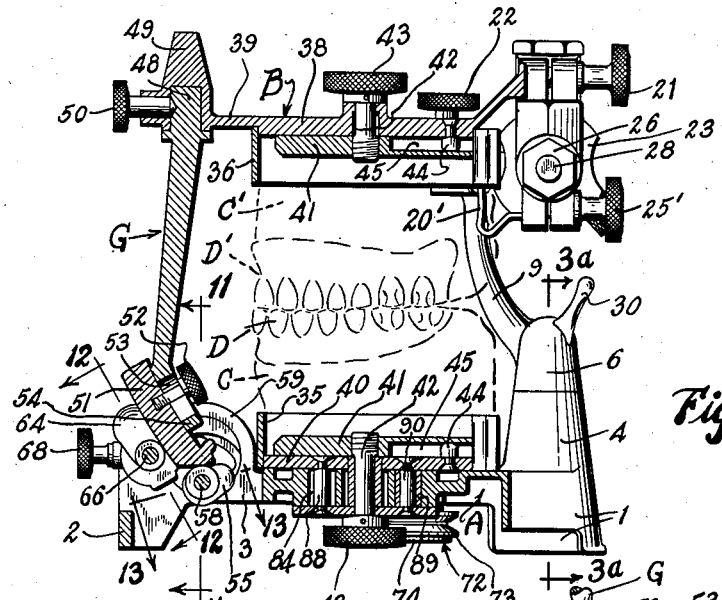
Fig. 10 is a sectional elevation of the articulator on line 10—10 of Fig. 2.
Figure 14:
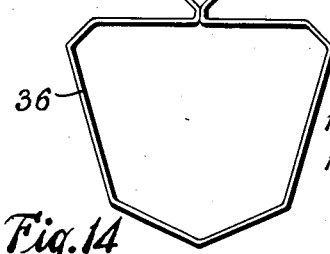
Figs. 14 and 15 are plan views of the upper and lower mold frames, respectively.
Figure 15:
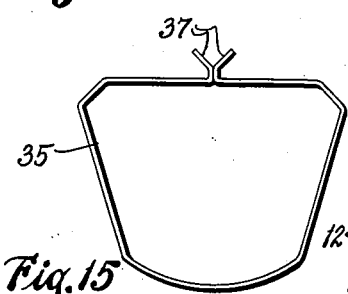
Figure 13:
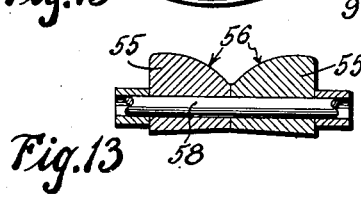
Fig. 13 is a section on line 13—13 of Fig. 10 of the inner incisal guide cams as seen substantially at right angles to the plane of section 11—11.
Figure 17:
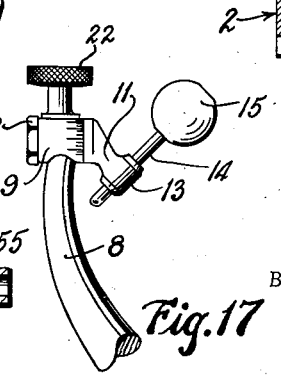

Casts C and C' for supporting artificial dentures D and D', respectively, are detachably mounted on the upper side of the lower member A and on the lower side of the upper member B, as shown in Figs. 4 and 10. The attaching portions of said casts are formed and held in extensible bands 35 and 36 bent into loops with their ends 37 in abutting positions as shown in Figs. 14 and 15. Said bands are of shallow depth and are adapted to be tensioned, respectively, over a thickened portion 38 of top plate 39 of member B and over a plate 40 attached to the plate 3 of the lower member A (see Fig. 10).

Centrally of the bands 35 and 36 in each of the members A and B we provide wedges 41, 41, which are detachably held on said members by means of screws 42, 42, having enlarged heads 43 and extended through the plates 3 and 39, respectively, with their end portions threaded into the wedges. The wedges are held against rotation by means of set pins 44 attached to the plates 3 and 39 and extended into elongated slots 45 in the wedges. It will be noted, as shown in Fig. 4, that the wedges 41 have undercut edges 46 and the forward ends of the wedges are substantially less in width than the rear edges thereof, thereby permitting the withdrawal of the wedges rearwardly from the casts C and C' without damaging the casts, their reinsertion in the casts at will, and the replacement of certain casts with dentures D and D' thereon by other casts and dentures. This feature is important for the reason that the articulator may not be out of usage because of the presence therein of a set of casts and dentures the work on which may be delayed while other casts and dentures are held up pending the completion of the former casts and dentures.

A pair or more of locating ribs or other forms of guides, as at 47, are provided on the adjacent sides of plates 3 and 39 which form corresponding depressions in the casts and together with the wedges 41 serve to locate the casts which may have been temporarily removed from the articulator and to hold them in their correct positions on members A and B.

Referring particularly to Figs. 10 to 13, inclusive, it will be observed that an incisal guide G is detachably held at the front of the articulator and supported on the upper member B. Said guide is held at its upper end 48 in a boss 49 formed on plate 39 of member B by means of a set screw 50 and is centrally positioned with respect to the condyle tracks. An adjustable guide member 51 is provided on the lower end of the pin G by means of a screw 52 extended through a slot 53 in a foot 54 of said pin G and threaded into member 51. Member 51 is of arcuate form, the radius of the arc of which is struck from the lateral axis of the condyles and its lower extremity is bevelled as shown in Fig. 10, for the purpose of accurate engagement and a proper relationship with the inner and outer incisal guide cams. It should be understood that it is essential to effect the lateral, protrusive and rotative movements of the upper member B to correspond to actual conditions obtaining in the mouth of a patient when producing artificial dentures. To this end we have provided two sets of cams for influencing the movement of the incisal guide G which operate independently and together for producing the desired movements.

Figure 11:
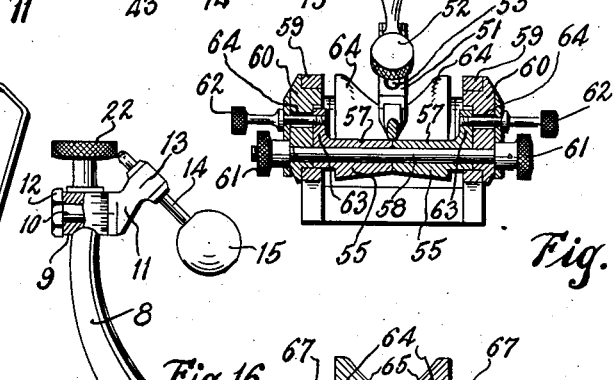
Fig. 11 is a sectional elevation on line 11—11 of Fig. 10 of the inner incisal guide cams.

The inner guide cams 55, 55, have convex faces 56 simulating the cusps of natural teeth and opposite flat faces 57 and are commonly mounted on a pin 58 for independent and common adjustment to desired positions. The foot 2 of the lower member A is bifurcated and has a pair of laterally spaced enlarged bearings 59, 59, in which discs 60, 60, are rotatably mounted and the pin 58 carrying the cams 55, 55, are journalled in said discs, as shown in Fig. 11, and have knurled nuts 61, 61, threaded on the opposite ends thereof. Said nuts 61 frictionally engage the outer faces of discs 60 and serve to lock said discs in position. Pin 58 is eccentrically positioned on disc 60, hence, the rotation of said discs will vary the position of the axis of cams 55 relative to the axis of the discs when the screws 61 are loosened, and the corresponding normal position of the incisal guide member 51 which engages the periphery of cams 55, as shown in Fig. 10.

However, when the axis of both of the cams 55 is fixed the cams may be independently adjusted on their axes by means of set screws 62, 62, which extend loosely through discs 60 and are threaded into portions 63, 63, of the cams 55, arcuate slots 64, 64, being provided in discs 60 for the reception of screws 62, 62. Thus, the cams 55 may be independently adjusted relative to the incisal guide member 51 for normal or abnormal protrusive or lateral motion when the condyle axes are correspondingly adjusted, so as to simulate the movement of the jaws of a particular human being.

The rotation centers of the members A and B, are established in a given case by means of the outer incisal guide cams 64, 64, which have concave faces 65 and are commonly mounted on a pin 66 which is fixedly held in portions 67, 67, of the foot 2 by means of set screws 68, 68, whereby said cams 64, 64, may be adjusted to corresponding or different positions, rotatively on their common axis, at a desired angle for engagement with the outer face of member 51, whereby the rotation centers may be varied as required.

The lower member A is provided with a grinding mechanism for the purpose of properly occluding the teeth of the dentures in a manner simulating natural occlusion, as by means of a dental lathe or other suitable power medium and is operatively connected with the plate 40 on which the lower cast C is mounted. Base plate 3 of member A has a boss 69 with a bore 70 therein adapted to rotatably receive a hub 71 formed on the upper half 71' of a pulley 72, the lower half 73 of which is covered by a plate 74 having graduations 75 thereon and adapted to be adjustably set at selective positions by means of screws 76, 76, which extend through arcuate slots 77, 77, in the half 73 of said pulley. Graduations 75 are adapted to selectively register with a single mark 78 on the bottom of pulley half 73 and member 73 has a hub 79 which is concentric with the periphery thereof but is provided with an eccentric bore 80 for the reception of a shaft 81. Likewise hub 71 of member 71' is eccentrically bored at 81' to receive the hub 79 of member 73, so as to provide an adjustable and variable axis for the plate 40 on which cast C is mounted.

Plate 3 of member A is depressed at 82 and has a centrally positioned elongated boss 83 with bores 84 and 85 therethrough and a laterally elongated slot 86 also extending therethrough, as shown in Fig. 7. The central bore 85 is slightly larger than a sleeve 87 through which the wedge locking screw 42 extends and bore 84 is slightly larger than a pin 88 which is secured to and depends from plate 40 and extends through said bore. A sleeve 89 with flattened sides is carried on a depending pin 90 from plate 40 and seats in the slot 86 in boss 83, and is arranged so that it may rotate on its axis while the plate 40 is moved laterally on its variable axis provided on the shaft 81.

Plate 40 also has a pin 91 extended through an enlarged bore 92 in plate 3 which is threaded to receive a lock nut 93 in frictional contact with the bottom of plate 3 (see Fig. 4). Thus, when the screws 76 of pulley 72 are loosened the lower half of the pulley may be adjusted relative to the upper half of said pulley for adjusting the axis of plate 40, by the movement of the eccentric hubs of the two pulley halves so as to vary the oscillatory movement of plate 40 in order to obtain and effect the proper occlusive or grinding relationships between the teeth of the upper and lower dentures. It will be understood that when power is applied to pulley 72 the plate 41 will move on an axis which of itself rotates about the axis of its bearing 69 and the bores 84, 85 and 92 and slot 86 will permit the movement of the plate to a desired extent while slot 86 will permit such an extent of lateral movement as may be necessary with a desired extent.

The extent of movement of plate 40 may be indicated on the bottom half of the pulley by means of the graduations 75 in association with the single marking 78 and a record of the adjustments in different cases may be kept for future reference and the remounting and regrinding of the dentures.

In operation, the casts C and C' are mounted on the lower and upper members A and B, respectively, and the condyle fulcrums 15 and track members 23 are adjusted at suitable angles relative to each other and to the incisal centric positions, depending upon individual cases, whereupon readings are taken of the adjustments from the several graduated scales and records made. The incisal guide cams 55 and 64 are also adjusted relative to the incisal guide G and the adjustable guide 51 set at a proper position on its pin for traversing the peripheries or facets of said cams, so as to reproduce the lateral, protrusive and rotative movements of the dentures in a given case. The true cusp relationship between the teeth of the dentures having been ascertained from impressions previously made, together with local conditions in each case affecting occlusion etc., the upper member B is manipulated, the relationship of the dentures is checked and the teeth are ground into a state of occlusion simulating natural conditions by applying power to the pulley 72.

A set of dentures may be quickly and readily removed from the articulator after having been treated as above described and replaced by another set, at will, without danger of impairing the relationship of the dentures, by detaching the screws 43 and then removing the dentures and casts with the wedges 41 therein, after which the wedges may be retracted from their positions in the casts. Said wedges are reinsertible in their correct positions for the purpose of replacing the casts in the members of the articulators, and the locating ribs 47, or the like are effective for the purpose of relocation of the casts. Of course no cast is removed without first having made accurate records of all of the many adjustments of the several parts of the articulator.

In general, it must be understood that the condyle fulcrums, instead of being fixedly supported and laterally alined, as in other types of articulators, are adjustable rotatably in the same or different horizontal planes, independently and together and to the same extent, and the condyle tracks are additionally adjustable relative to said fulcrums so as to permit the lateral, protrusive and rotative movement of the upper denture relative to the lower denture. Moreover, the incisal guide and the incisal guide cams are relatively adjustable for reproducing any natural, unnatural, deformed or abnormal movement of the natural dentures.

What we claim as our invention and desire to secure by Letters Patent is:

1. A dental articulator comprising: relatively adjustable upper and lower members adapted to support a set of artificial dentures in position thereon, means at the forward extremities of said members engageable for regulating and effecting the lateral, protrusive and rotative movement of said upper member relative to said lower member, tracks on said upper member, and condyle fulcrums supported on said lower member and engageable with the tracks on said upper member and separately adjustable with and bodily adjustable independently of said tracks for varying the positions of said fulcrums as required to reproduce natural conditions, said condyle fulcrums having broken axes including rotatably adjustable stems, fulcrums being rotatably and slidably supported on axes at angles relative to said stems, whereby said fulcrums may be adjusted for varying the rotation centers of said upper member.

2. A dental articulator comprising: relatively adjustable upper and lower members adapted to support a set of artificial dentures in position thereon, means at the forward extremities of said members engageable for regulating and effecting the lateral, protrusive and rotative movement of said upper member relative to said lower member, tracks on said upper member, condyle fulcrums supported on said lower member and engageable with the tracks on said upper member and separately adjustable with and independently of said tracks for varying the positions of said fulcrums as required to reproduce natural conditions, and means on at least one of said members and adapted to be power driven for moving one of the dentures relative to the other on variable axes of rotation, said last mentioned means including a plate for supporting the movable denture, and operating means therefor comprising a pair of telescoping eccentrics associated with said plate and adapted to be adjusted for varying the axis of rotation of said movable denture.

3. A dental articulator comprising: relatively adjustable upper and lower members adapted to support a set of artificial dentures in position thereon, means at the forward extremities of said members engageable for regulating and effecting the lateral, protrusive and rotative movement of said upper member relative to said lower member, tracks on said upper member, condyle fulcrums supported on said lower member and engageable with the tracks on said upper member and separately adjustable with and independently of said tracks for varying the positions of said fulcrums as required to reproduce natural conditions, and means for adjustably supporting said condyle fulcrums for divergently positioning the same relative to true lateral alinement.

4. A dental articulator comprising: relatively adjustable upper and lower members adapted to support a set of artificial dentures in position thereon, means at the forward extremities of said members engageable for regulating and effecting the lateral, protrusive and rotative movement of said upper member relative to said lower member, tracks on said upper member, condyle fulcrums supported on said lower member and engageable with the tracks on said upper member and separately adjustable with and independently of said tracks for varying the positions of said fulcrums as required to reproduce natural conditions, a pair of coaxial inner cams and a pair of coaxial outer cams on said lower member, and an incisal guide on said upper member arranged for engagement with said inner and said outer cams for influencing the movement of said upper member relative to said lower member.

5. A dental articulator comprising: relatively adjustable upper and lower members adapted to support a set of artificial dentures in position thereon, means at the forward extremities of said members engageable for regulating and effecting the lateral, protrusive and rotative movement of said upper member relative to said lower member, tracks on said upper member, condyle fulcrums supported on said lower member and engageable with the tracks on said upper member and separately adjustable with and independently of said tracks for varying the positions of said fulcrums as required to reproduce natural conditions, a pair of coaxial inner cams and a pair of coaxial outer cams on said lower member, an incisal guide on said upper member arranged for engagement with said inner and said outer cams for influencing the movement of said upper member relative to said lower member, and means for independently and commonly adjusting the cams of each of said pairs to said incisal guide.

6. A dental articulator comprising: relatively adjustable upper and lower members adapted to support a set of artificial dentures in position thereon, means at the forward extremities of said members engageable for regulating and effecting the lateral, protrusive and rotative movement of said upper member relative to said lower member, tracks on said upper member, condyle fulcrums supported on said lower member and engageable with the tracks on said upper member and separately adjustable with and independently of said tracks for varying the positions of said fulcrums as required to reproduce natural conditions, a pair of coaxial inner cams and a pair of coaxial outer cams on said lower member, an incisal guide on said upper member arranged for engagement with said inner and said outer cams for influencing the movement of said upper member relative to said lower member, and means for independently and commonly adjusting the cams of each of said pairs to said incisal guide, said incisal guide including a support and a member adjustable thereon relative to said cams and formed with faces engageable with said sets of cams.

7. A dental articulator comprising: relatively stationary and movable members, said stationary member having a base and transversely alined standards at the rear thereof, means for rotatably adjustably adjusting said standards, spherical condyle fulcrums having horizontal axes adjustable on said standards and rotatable and slidable on portions disposed at angles relative to said horizontal axes, condyle tracks including members rotatably adjustable on said upper member on transversely alined axes, said tracks being inclinable for receiving and guiding said fulcrums, and cooperating means on said stationary and movable members for guiding the movement of the movable member relative to the stationary member.

8. A dental articulator comprising: relatively stationary and movable members, said stationary member having a base and transversely alined standards at the rear thereof, means for rotatably adjustably adjusting said standards, spherical condyle fulcrums having horizontal axes adjustable on said standards and rotatable and slidable on portions disposed at angles relative to said horizontal axes, condyle tracks including members rotatably adjustable on said upper member on transversely alined axes, said tracks being inclinable for receiving and guiding said fulcrums, cooperating means on said stationary and movable members for guiding the movement of the movable member relative to the stationary member, means for detachably supporting casts with dentures thereon on said stationary and movable members in simulation of natural positions, and means on said stationary member for movably supporting the associated denture and cast whereby the same may be moved relative to the denture and cast on the other member.

9. A dental articulator comprising: relatively stationary and movable members, said stationary member having a base and transversely alined standards at the rear thereof, means for rotatably adjustably adjusting said standards, spherical condyle fulcrums having horizontal axes adjustable on said standards and rotatable and slidable on portions disposed at angles relative to said horizontal axes, condyle tracks including members rotatably adjustable on said upper member on transversely alined axes, said tracks being inclinable for receiving and guiding said fulcrums, cooperating means on said stationary and movable members for guiding the movement of the movable member relative to the stationary member, and means for locking said standards, said fulcrums and said tracks in adjusted positions.

10. A dental articulator comprising: relatively stationary and movable members, said stationary member having a base and transversely alined standards at the rear thereof, means for rotatably adjustably adjusting said standards, spherical condyle fulcrums having horizontal axes adjustable on said standards and rotatable and slidable on portions disposed at angles relative to said horizontal axes, condyle tracks including members rotatably adjustable on said upper member on transversely alined axes, said tracks being inclinable for receiving and guiding said fulcrums, cooperating means on said stationary and movable members for guiding the movement of the movable member relative to the stationary member, means for detachably supporting casts with dentures thereon on said stationary and movable members in simulation of natural positions, means on said stationary member for movably supporting the associated denture and cast whereby the same may be moved relative to the denture and cast on the other member, and means for varying the axis of the denture support on said stationary member for producing rotation of the denture on the stationary member relative to that on the movable member.

11. A dental articulator comprising relatively adjustable upper and lower members for supporting a set of artificial dentures, means associated with said members cooperating for regulating and effecting movement of said upper member relative to said lower member, tracks on said upper member, condyle fulcrums supported on said lower member and engageable with said tracks and being separately adjustable with and independently of said tracks for varying the position of said fulcrums as required to produce natural movements and means for adjustably supporting said condyle fulcrums for divergently positioning the same relative to true lateral alignments.

WILLIAM E. VAN DORN.
WILFRID H. TERRELL.